Figure 1:
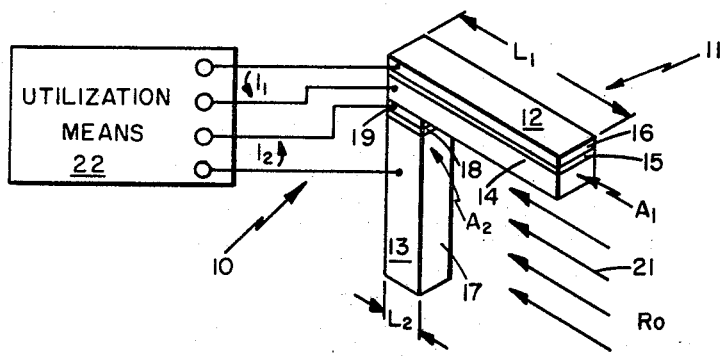

GORDON KRAMER
INVENTOR.

BY Alden D Redfield
   Abraham Ogman

ATTORNEYS

United States Patent Office

3,329,815
Patented July 4, 1967

3,329,815
DEVICE FOR MEASURING BEAM QUALITY OF IONIZING RADIATION COMPRISING FIRST AND SECOND DETECTORS OF DIFFERENT RADIATION LENGTHS
Gordon Kramer, Norman, Okla., assignor to Avco Corporation, Cincinnati, Ohio, a corporation of Delaware
Filed Jan. 22, 1964, Ser. No. 339,499
22 Claims. (Cl. 250—83.3)

This invention relates generally to devices for measuring the beam quality of ionizing radiation, and in particular to a device for instantaneously measuring beam quality, preferably using solid state detectors.

Definitions (1) Radiation—mono- or multi-chromatic electromagnetic energy in energy levels in excess of 100 ev.
(2) Beam quality—a measure of the effective energy of a beam of radiation.
(3) Radiation length—the length of a detector parallel to the direction of incident radiation.

Prior art

Existing X-ray and gamma ray spectrometry techniques embody photo-peak measurements of pulses obtained by photomultipliers in conjunction with scintillating material. Such a technique is satisfactory when discrete isotopes are involved and sufficient time is allowed for photo-peak build up. Photomultiplier techniques generally cannot be used when a continuous spectrum is being measured, since the wide range of Compton electrons produced from higher energy photons interferes with photo-peaks of lower energy photons. In such a case, an absorption curve for the radiation is laboriously plotted with the use of a gas ionization chamber and the effective energy and, more conveniently, the Half Value Layer (the thickness of material required to reduce beam intensity to 50% of its initial value) is determined. This is accomplished by a sequence of measurements using different thicknesses of absorbers to plot an absorption curve by the beam and then determine its Half Value Layer.

It is proposed to describe a device which will give an instantaneous readout of the beam quality.

It is an object of the invention to provide a device for measuring the beam quality of ionizing radiation which avoids the limitations and disadvantages of prior art devices.

Other objects of the invention are to provide a device for measuring the beam quality of ionizing radiation in which:

(1) The detectors used to make the measurement are solid state detectors;
(2) The ratio of currents generated in solid state detectors is used to determine beam quality;
(3) The detectors used are more sensitive than gas-filled detectors, and unlike scintillating crystals, are not susceptible to saturation;
(4) Measurements in both the pulse counting mode and the current mode may be made;
(5) The detectors operate as photovoltaic devices and the short circuit currents are relatively independent of temperatures up to at least 60° C.; and
(6) The detectors are inherently stable and reliable.

In accordance with the invention, a device for measuring the quality of a beam of ionizing radiation comprises two detectors, a first detector having a first radiation length for generating a first current, the first current is a function of the radiation absorbed in the first detector. The second detector havving a second radiation length substantially smaller than the first radiation length of the first detector. The second detector is provided for generating a second current which is a function of the radiation absorbed therein. Means for using the first and second currents to determine beam quality is also provided in the measuring device. This utilization means is preferably a measuring device for using the ratio of the first and second currents to provide a signal representing beam quality.

Figure 2A:
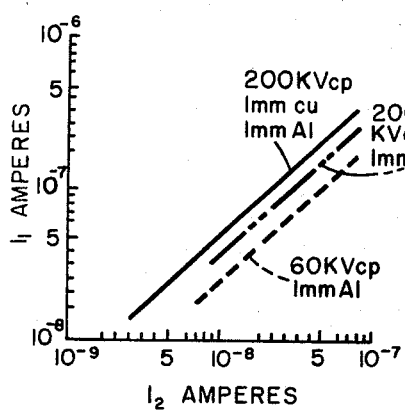
Figure 2B:
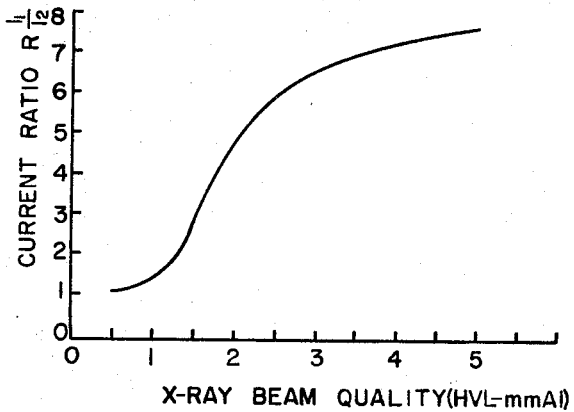
Figure 5:
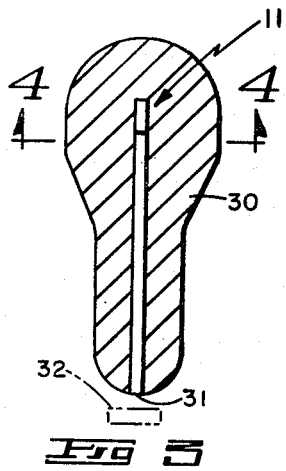
Figure 4:
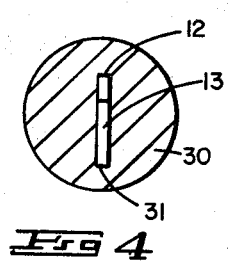
Figure 6:
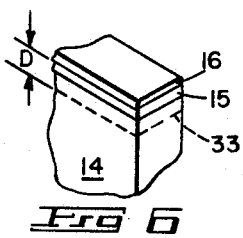
Figure 3:
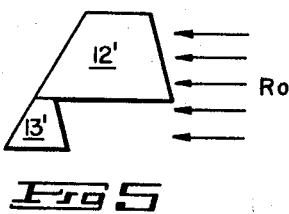

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is a device for measuring the beam quality of ionizing radiation.
FIGURE 2A includes curves useful in explaining the operation of the FIGURE 1 device.
FIGURE 2B is another curve useful in explaining the FIGURE 1 device.
FIGURE 3 shows the FIGURE 1 measuring device in combination with a beam collimating means.
FIGURE 4 is a section taken along lines 4—4 in FIGURE 3.
FIGURE 5 depicts a detector having another geometric configuration.
FIGURE 6 is an enlarged representation of the sensitive area of a solid state detector.

Detector construction and characteristics

The response of p-n junction solid state detectors to radiation sources is well known. In particular, a p-n junction formed by diffusing lithium on the surface of a p-silicon material has been widely used for a radiation detector. p-i-n junctions can also be used as detectors. p-i-n junctions offer a larger sensitive area to incident radiation directed parallel to the junction plane. Whereby, the preferred lithium-silicon junction detectors have been used, there is no theoretical reason why germanium detectors and n-p detectors, as well as other semi-conductor devices having similar characteristics to the lithium-silicon system cannot be used.

Preferably, the junction is formed on a surface which is parallel to the direction of incident energy. As a consequence, the detector has a uniform sensitivity to ionization radiation along its entire length. With no bias, these detectors operate preferably as photovoltaic devices in the short circuit current mode, and the internal junction potential provides the collecting field. There is no dark current to null out. The lower collecting field does reduce the sensitivity of the detector, and it may be desirable to operate the detector with a reverse bias at low dose rates.

Description of FIGURE 1 measuring device

Referring to FIGURE 1 of the drawings, there is shown a measuring device 10 for measuring the beam quality of ionizing radiation. The measuring device 10 comprises a detector means generally designated 11 which includes a first detector 12 having a radiation length $L_1$ and an effective cross sectional area $A_1$ and a second detector 13 having a radiation length $L_2$ and an effective cross sectional area $A_2$.

When considering the cross sectional area of a detector the dimension perpendicular to the junction plane is determined by the diffusion length of the minority carriers in the silicon rather than the geometrical length. See A of FIGURE 6 where the dotted line 33 represents the boundary of the effective cross sectional area. See also R. L. Cummerow, Physical Review, Vol. 95, p. 16 (1954).

Detector 1 comprises preferably a p-i-n junction formed from a p-type silicon body 14, a layer of intrinsic silicon 15, and a thin layer of lithium 16 diffused on the intrinsic 15 forming the $n$ portion of the junction. In a similar manner, detector 13 contains a p-i-n junction comprising a silicon body 17, an intrinsic layer 18, and a diffused lithium layer 19. It will be noted that the junction planes in detectors 12 and 13 are parallel to the direction of incident radiation R designated by means of the arrows 21 in FIGURE 1.

As noted above, a short-circuit current is generated in each of the detectors when exposed to the incident radiation 21. Each of the detectors is coupled to a utilization means 22 wherein preferably the ratio of the currents $I_1$ from detector 12 and currents $I_2$ from detector 13 is computed, and a signal generated which is representative of this ratio. The current ratio readings may be converted directly into beam quality readings and recorded on a meter. In the alternative, the current ratio may be derived from the utilization means 22 and converted by means of charts to beam quality.

Operation

With radiation of intensity $R_0$, incident on both detectors 12 and 13, the currents $I_1$ and $I_2$ generated are proportional to the energy absorbed from the radiation beam. Assuming an exponential attenuation for the beam within the detectors, the currents generated in each detector are calculable as in Equations 1 and 2.

$$I_1 = kA_1R_0\frac{\mu a}{\mu o}(1-e^{-\mu o L_1}) \quad (1)$$

$$I_2 = kA_2R_0\frac{\mu a}{\mu o}(1-e^{-\mu o L_2}) \quad (2)$$

where:

$I_1$ and $I_2$ = radiation generated current
$\mu o$ = attenuation coefficient
$\mu a$ = absorption coefficient
$A_{1,2}$ = detector effective cross sectional area
$L_{1,2}$ = detector radiation length If the ratio of the currents is taken, a signal S is generated which is dependent on the geometry of the detectors and the attenuation coefficient of the radiation, but independent of the radiation intensity, or $$S = \frac{I_1}{I_2} = \frac{A_1}{A_2}\left(\frac{1-e^{-\mu o L_1}}{1-e^{-\mu o L_2}}\right) \quad (3)$$

Referring to FIGURE 2(A) wherein there is plotted a log-log representation of $I_1$ as a function of $I_2$, the curves depicted therein were obtained by varying the intensity of radiation with the energy of the radiation held constant. All points fall on a straight line. The lines for different energies are all parallel at a slope of 45°, and the intercepts, which represent the ratio of currents, vary for the different energies in accordance with the following function:

$$\text{Log } I_1 = \text{Log } R + \text{Log } I_2 \quad (4)$$

which is readily recognized as the conventional slope intercept representation of a straight line. If the ratios are plotted as a function of beam quality, a curve similar to that shown in FIGURE 2(B) results.

Should $\mu o\ L_1$ and $\mu o\ L_2$ be very much larger than 1, Equation 3 becomes $$S = I_1/I_2 = A_1/A_2 \quad (5)$$

The condition represented by Equation 5 occurs at low energy levels where substantially all of the incident energy is absorbed by both detectors. Assuming $A_1 = A_2$, the current ratio S becomes unity. At some energy level, a significant amount of radiation begins to pass through detector 13, although most of the energy at this level is still absorbed by detector 12, because $L_1$ is greater than $L_2$. It follows, therefore, that as the beam quality increases the ratio S increases.

When the energy level of the radiation reaches a value where it can no longer be completely absorbed by detector 12 and a significant portion begins to pass through detector 12, the current ratio S approaches a maximum. This operating condition corresponds to the boundary condition of $\mu o\ L_1$ and $\mu o\ L_2$ being very much smaller than 1. Equation 3 becomes:

$$S = A_1L_1/A_2L_2 \quad (6)$$

The foregoing conditions represent the operational range of the detector means 10 which is controlled by the dimensions of $L_1$ and $L_2$.

A practical set of dimensions for $L_1$ and $L_2$ for use with X-rays alone are $L_1 = 1.6$ cm. and $L_2 = 0.16$ cm.

To simplify matters, the cross section area $A_1$ and $A_2$ are equalized. Curve 2(B) is a representation of the current ratio as a function of radiation energy for the above-specified device.

Where it is intended to cover the measuring range to 35 kev. at the lower end and 7 kev. at the upper end, the following dimensions are suggested: $L_1 = 10$ cm., $L_2 = 0.1$ cm.

The high end of the measuring range can be further extended by inserting layers of absorbers such as aluminum or copper foils, such as foil 32 shown in FIGURE 3, in front of the detectors. These absorbers are analogous to resistance multipliers commonly used in voltmeters.

From the foregoing it is clear that in order to measure the quality of an X-ray source, the radiation has to be significantly attenuated within the detector radiation length. Conventionally, the solid state detectors are operated with the direction of the radiation perpendicular to the junction plane. In this mode, however, the radiation length is limited by the characteristic of the silicon, as shown by dimension D in FIGURE 6. To obtain the long radiation lengths necessary to measure the quality of X-ray beam, it is therefore necessary to operate the detector with the junction plane parallel to the direction of the radiation.

The direction of radiation source may be obtained accurately by imbedding the detector in a collimating device such as the pear-shaped lead mass 30 as shown in FIGURE 3. The detectors are located at the remote end of a collimating slit 31. The purpose of the slit is to assure that the radiation reaches the detectors as parallel rays. Clearly, by rotating the shield 30, the direction of the radiation source may be accurately determined. FIGURE 4 shows the orientation of detectors 12 and 13 situated in the remote end of the collimating slit 31.

Detectors 12 and 13 shown in FIGURE 1 are right prisms. This is not a limiting configuration. FIGURE 5 shows an alternate configuration designated detectors 12' and 13' which is as effective. Because the cross sectional areas and radiation lengths of detectors 12 and 13 vary, these detectors present to the radiation an effective cross sectional area and an effective radiation length which differ from physical geometric dimensions. The effective lengths and areas may be easily calculated for the simple shapes shown. However, a more suitable procedure is to determine the effective area and radiation length by calibrating these devices against known values of energy.

It is clear from the foregoing discussion that the measuring device 10, shown in FIGURE 1, provides a simple, reliable means for generating instantaneously an accurate quantitative measurement of a radiation beam energy. The currents $I_1$ and $I_2$ may be utilized to merely compute the beam energy, or they may be coupled to an electronic circuitry and used in a control circuit for accurately controlling the beam energy. The semiconductor detectors are particularly useful in this application since their response is substantially instantaneous to change in energy values of the incident radiation.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. A directional radiation beam quality measuring device comprising:
    (a) a mass formed from a radiation absorbing material containing an elongated slot for receiving incident radiation, the depth of said slot being sufficiently long to allow radiation moving parallel to the longitudinal walls of that slot to reach said remote end of said slot;
    (b) a detecting means comprising a first detector having a radiation length for totally absorbing entering beam radiation for generating a first current, said first current being a function of the radiation absorbed therein, and a second detector having a second radiation length for partially absorbing entering beam radiation for generating a second current, said second current being a function of the radiation absorbed therein, said first and second detectors being situated adjacent to the remote end of said slot; and
    (c) means coupled to said first and second detectors for determining and utilizing said first and second currents to determine the beam quality of the radiation entering said slot.

2. A device as described in claim 1 in which said detectors are solid state junction detectors.

3. A device as described in claim 1 in which said detectors are solid state junction detectors having the planes of said junctions parallel to the direction of incident radiation.

4. A device as described in claim 1 in which said detectors are p-n silicon junction detectors.

5. A device as described in claim 1 in which said detectors are p-i-n silicon junction detectors.

6. A device as described in claim 3 in which said detectors are right prisms oriented such that their geometric lengths are in a transverse relationship.

7. A device as described in claim 6 in which the effective cross sectional area of said first and second detectors are equal.

8. A device for measuring the beam quality of ionizing radiation comprising:
    (a) a first detector having a first radiation length for totally absorbing entering beam radiation for generating a first current, said first current being a function of the radiation absorbed therein;
    (b) a second detector having a second radiation length for absorbing a portion of entering beam radiation for generating a second current, said second current being a function of the radiation absorbed therein; and
    (c) means for determining and utilizing said first and second currents to determine the beam quality.

9. A device as described in claim 8 in which said detectors are solid state detectors.

10. A device as described in claim 8 in which said detectors are solid state junction detectors having the planes of said junctions parallel to the direction of incident radiation.

11. A device as described in claim 10 in which said solid state junction detectors comprise silicon devices.

12. A device as described in claim 11 in which said junctions are p-n junctions.

13. A device as described in claim 11 in which said junctions are p-i-n junctions.

14. A device as described in claim 8 in which said first and second radiation lengths are substantially different.

15. A device for measuring the beam quality of ionizing radiation comprising:
    (a) a first detector having a first radiation length, $L_1$, for totally absorbing entering beam radiation for generating a first current, said first current being a function of $$kA_1R_0\frac{\mu a}{\mu o}(1-e^{-\mu o L_1})$$

(b) a second detector having a second radiation length, $L_2$, for absorbing a portion of entering beam radiation, for generating a second current, said second current being a function of $$kA_2\frac{\mu a}{\mu o}(1-e^{-\mu o L_2})$$

wherein $\mu o$ equals attenuation coefficient, $\mu a$ equals absorption coefficient, $A_1$ equals the cross sectional area of the first detector, $A_2$ equals cross sectional area of the secnd detector and $k$ equals a constant; and
    (c) means for determining and utilizing the ratios of said first and second currents for determining the beam quality.

16. A device for measuring the beam quality of ionizing radiation comprising:
    (a) a first detector having a first radiation length, $L_1$, for generating a first current, said first current being a function of $$kA_1R_0\frac{\mu a}{\mu o}(1-e^{-\mu o L_1})$$

(b) a second detector having a second radiation length, $L_2$, for generating a second current, said second current being a function of $$kA_2R_0\frac{\mu a}{\mu o}(1-e^{-\mu o L_2})$$

the dimensions of $L_1$ and $L_2$ being selected such that the ratio of said first and second currents shall be less than $A_1L_1/A_2L_2$ and more than $A_1/A_2$, wherein $\mu o$ equals attenuation coefficient, $\mu a$ equals absorption coefficient, $A_1$ equals the cross sectional area of the first detector, $A_2$ equals cross sectional area of the second detector, $k$ equals a constant and $R_0$ equals incident radiation intensity; and
    (c) means for determining and utilizing the current ratio for determining the beam quality.

17. A device as described in claim 16 in which said detectors are solid state detectors.

18. A device as described in claim 16 in which said detectors are solid state junction detectors and further wherein the planes of said junction are parallel to the direction of incident radiation.

19. A device as described in claim 16 in which said detectors are silicon junction devices.

20. A device as described in claim 19 in which said junctions are p-n junctions.

21. A device as described in claim 19 in which said junctions are p-i-n junctions.

22. A device as described in claim 19 in which said detectors comprise a silicon body on which a coating of lithium has been diffused and drifted on one surface.

References Cited
UNITED STATES PATENTS

| | | | |
|---|---|---|---|
| 2,790,088 | 4/1957 | Shive | 250—211 |
| 2,846,592 | 8/1958 | Rutz | 330—33 X |
| 2,988,639 | 6/1961 | Welker et al. | 250—83.3 X |
| 3,040,262 | 6/1962 | Pearson | 307—88.5 X |
| 3,140,395 | 7/1964 | Scherbatskoy | 250—83.3 X |
| 3,202,822 | 8/1965 | Kehler | 250—83.3 |

RALPH G. NILSON, *Primary Examiner.*

ARCHIE R. BORCHELT, *Examiner.*

S. ELBAUM, *Assistant Examiner.*